Patented Oct. 14, 1952

2,614,090

UNITED STATES PATENT OFFICE 2,614,090

STABILIZATION OF VINYLIDENE CYANIDE POLYMER SOLUTIONS

Seward J. Averill, Boston, Ohio, assignor to The B. F. Goodrich Company, New York, N. Y., a corporation of New York No Drawing. Application August 15, 1949, Serial No. 110,460

6 Claims. (Cl. 260—32.6)

This invention relates to the stabilization of solutions containing a dissolved polymer of vinylidene cyanide, and relates particularly to the use of organic carboxylic acid anhydrides for stabilizing the viscosity of solutions of polyvinylidene cyanide.

In a copending application, Serial No. 11,336, filed February 26, 1948, it is disclosed that vinylidene cyanide polymers having molecular weights in excess of 25,000 may be utilized in the preparation of polymer solutions which are extremely useful as spinning solutions and casting solutions from which are obtained filaments, films, and the like, greatly superior to similar articles obtained from other polymers such as polyamides, polyvinylidene chloride and the like.

It has been found desirable, however, that polyvinylidene cyanide solutions be stabilized so as to maintain a desired viscosity, since such solutions tend to become less viscous on standing, especially for long periods of time, probably because of degradation of the polymer chain.

Accordingly, it is the principal object of this invention to provide suitable materials for minimizing degradation of vinylidene cyanide polymer chains and for maintaining the viscosity of vinylidene cyanide polymer solutions at the high level necessary for spinning and casting. Other objects will be apparent from the following description of the invention.

I have now discovered that organic carboxylic acid anhydrides are excellent stabilizers for vinylidene cyanide polymer solutions. By the use of such an anhydride it is possible to maintain the viscosity of vinylidene cyanide polymer solutions within a range suitable for the spinning of excellent filaments and the casting of films, for long periods of time, so that the polymer solution need not be used as soon as it is made up, but may be stored in relatively large quantities and utilized as needed.

The anhydrides which are stabilizers for solutions of vinylidene cyanide polymers in accordance with this invention are anhydrides of organic carboxylic acids of the formula R(COOH)$_n$ wherein R is a hydrocarbon radical and $n$ is an integer equal to the valence of R. Included within this class are the anhydrides of such acids as acetic, propionic, butyric, isobutyric, caprylic, caproic, capric, lauric, palmitic, stearic and other saturated aliphatic monocarboxylic acids; acrylic, crotonic, oleic, linoleic and other unsaturated aliphatic monocarboxylic acids; cyclohexanoic, furoic, toluic, cinnamic, and other alicyclic, heterocyclic, and aromatic monocarboxylic acids; oxalic, succinic, adipic, sebacic, aconitic, maleic, isophthalic, 1,1,5-pentanetricarboxylic acid, 5-octene-3,3,6-tricarboxylic acid and other polycarboxylic acids.

Because of availability, low cost, and great effectiveness, the preferred anhydrides for use in this invention possess the formula R$_1$(CO)$_2$O, wherein R$_1$ represents hydrocarbon structure, preferably aliphatic and containing from 2 to 8 carbon atoms and accordingly, the preferred embodiments of the invention include the stabilization of polyvinylidene cyanide solutions with acetic anhydride, propionic anhydride, butyric anhydride, succinic anhydride and adipic anhydride. It is to be understood, however, that anhydrides of any of the acids listed in the foregoing paragraph stabilize solutions of polyvinylidene cyanide with good results and are included within the scope of the invention.

The stabilizing effect of the organic carboxylic acid anhydrides occurs regardless of the solvent used to dissolve the vinylidene cyanide polymer or the concentration of the polymer in the solution. Polyvinylidene cyanide possessing a molecular weight in excess of 25,000 is at present known to be soluble in only a limited number of solvents, and is completely insoluble in a great number of solvents commonly used to dissolve polymers. However, dimethyl formamide, tetramethylene sulfone and tetramethyl urea have been found to be excellent solvents for polyvinylidene cyanide and solutions of the polymer in such solvents, which solutions ordinarily contain from about 0.1 to 20% by weight of polymer, are of great value for spinning into fibers and casting into films.

The amount of stabilizer used in the polymer solution is not critical and may be varied widely. In general, however, it is desirable that from about 0.1% to 10% by weight of stabilizer, based on the weight of the solution, be employed, with a particularly preferred range being from 0.1% to 5% by weight.

The stabilized compositions of this invention are preferably prepared by adding the vinylidene cyanide polymer to a mixture of the solvent and the organic acid anhydride or by adding the stabilizer and polymer to the solvent simultaneously. In this manner any chain degradation which normally occurs during solvation is prevented. However, the organic acid anhydride will arrest further chain degradation even if added after the polymer is in solution.

The following example is intended to illustrate the use of organic carboxylic acid anhydrides as stabilizers for polyvinylidene cyanide solutions in accordance with this invention, but is not to be construed as a limitation upon the scope thereof, for there are, of course, numerous possible variations and modifications.

Example

A solution is prepared by dissolving 0.5% by weight of polyvinylidene cyanide in dimethyl formamide which contains 1% by weight of acetic anhydride. A second solution of similar concentration, and containing 1% by weight of succinic anhydride in place of acetic anhydride is also prepared. A third 0.5% solution, containing no stabilizer, is maintained as a control sample. Approximately one hour is required to completely dissolve the polymer. When the solutions are homogenous they are transferred to an Ostwald type viscosimeter and placed in a 25° C. constant temperature bath. The intrinsic viscosities are determined periodically according to the following equation:

$$\text{Intrinsic viscosity} = \frac{\log_e \frac{T_1}{T_0}}{C}$$

wherein $T_1$=viscosity of polymer solution.
$T_0$=viscosity of the solvent in the same units and at the same temperature as $T_1$.
$C$=grams of polymer per 100 ml. of solution.

The intrinsic viscosities thus obtained are shown as a function of time in the table below:

Table

| Control | | 1% Acetic Anhydride | | 1% Succinic Anhydride | |
|---|---|---|---|---|---|
| Time, Hours | Intrinsic Viscosity | Time, Hours | Intrinsic Viscosity | Time, Hours | Intrinsic Viscosity |
| 0 | 2.92 | 0 | 5.12 | 0 | 4.15 |
| 1 | 2.35 | 1 | 5.00 | 1 | 3.73 |
| 2 | 2.05 | 2 | 4.90 | 2 | 3.58 |
| 4 | 1.70 | 4 | 4.73 | 4 | 3.40 |
| 10 | 1.40 | 10 | 4.50 | 10 | 3.20 |
| 24 | 1.10 | 24 | 4.00 | 24 | 3.05 |
| 40 | 1.00 | 40 | 3.55 | 40 | 2.93 |

The excellent stabilizing effect on polyvinylidene cyanide obtained by the use of organic anhydrides is readily apparent from the table. Of special significance is the fact that the organic anhydride prevents the very great original degradation which occurs as the polymer dissolves when no stabilizer is present and the fact that when an organic anhydride is used the viscosity of the polymer solutions is maintained within the desired range for spinning and casting solutions for relatively long periods of time.

When other of the organic anhydrides listed hereinabove are utilized, the stabilizing effect on solutions of polyvinylidene cyanide is in general equivalent to that obtained with acetic and succinic anhydrides, regardless of the solvent which is used for the polymer. Moreover, solutions of other vinylidene cyanide polymers such as those prepared by copolymerizing vinylidene cyanide with other unsaturated monomers, particularly those containing a preponderant amount of vinylidene cyanide units, are also stabilized substantially as effectively by the organic anhydrides as is the straight polyvinylidene cyanide.

Although specific examples of the invention have been herein described, it is not intended that the invention be limited thereto, for numerous variations and modifications will be apparent to those skilled in the art and are within the spirit and scope of the appended claims.

I claim:

1. A composition comprising a solution of a polymer of vinylidene cyanide stabilized with an anhydride of an acid of the formula $R(COOH)_n$, wherein R is a saturated aliphatic hydrocarbon radical and $n$ is an integer equal to the valence of R said composition being characterized by possessing a viscosity on preparation and after 40 hours which is substantially higher than that of a solution of a polymer of vinylidene cyanide consisting solely of polymer and solvent.

2. A composition comprising a solution of a polymer of vinylidene cyanide stabilized with an anhydride of the formula $R_1(CO)_2O$ wherein $R_1$ represents saturated aliphatic hydrocarbon structure said composition being characterized by possessing a viscosity on preparation and after 40 hours which is substantially higher than that of a solution of a polymer of vinylidene cyanide consisting solely of polymer and solvent.

3. A composition comprising a solution of a polymer of vinylidene cyanide stabilized with from 0.1% to 10% by weight of an anhydride of the formula $R_1(CO)_2O$, wherein $R_1$ represents saturated aliphatic hydrocarbon structure containing from 2 to 8 carbon atoms said composition being characterized by possessing a viscosity on preparation and after 40 hours which is substantially higher than that of a solution of a polymer of vinylidene cyanide consisting solely of polymer and solvent.

4. A composition comprising a solution of polyvinylidene cyanide in dimethyl formamide and, as a stabilizer for said solution, from 0.1 to 5% by weight of an anhydride of the formula $$R_1(CO)_2O$$

wherein $R_1$ represents saturated aliphatic hydrocarbon structure containing from 2 to 8 carbon atoms said composition being characterized by possessing a viscosity on preparation and after 40 hours which is substantially higher than that of a solution of a polymer of vinylidene cyanide consisting solely of polymer and dimethyl formamide.

5. A composition comprising a solution of polyvinylidene cyanide in dimethyl formamide and, as a stabilizer for said solution, from 0.1 to 5% by weight of acetic anhydride said composition being characterized by possessing a viscosity on preparation and after 40 hours which is substantially higher than that of a solution of a polymer of vinylidene cyanide consisting solely of polymer and dimethyl formamide.

6. A composition comprising a solution of polyvinylidene cyanide in dimethyl formamide and, as a stabilizer for said solution, from 0.1% to 5.0% by weight of succinic anhydride said composition being characterized by possessing a viscosity on preparation and after 40 hours which is substantially higher than that of a solution of a polymer of vinylidene cyanide consisting solely of polymer and dimethyl formamide.

SEWARD J. AVERILL.

REFERENCES CITED

The following references are of record in the file of this patent:

UNITED STATES PATENTS

| Number | Name | Date |
|---|---|---|
| 2,316,196 | Tucker | Apr. 13, 1943 |
| 2,396,785 | Hanford | Mar. 19, 1946 |
| 2,502,030 | Scheiderbauer | Mar. 28, 1950 |